United States Patent [19]

Carduck et al.

[11] 4,415,124
[45] Nov. 15, 1983

[54] METHOD FOR THE PRODUCTION OF MICROPOWDERS FROM CELLULOSE ETHERS OR CELLULOSE

[75] Inventors: Franz-Josef Carduck, Haan; Wilfried Rähse, Düsseldorf; Willi Wüst, Ratingen-Hösel; Hans Pabel, Düsseldorf, all of Fed. Rep. of Germany

[73] Assignee: Henkel Kommanditgesellschaft Auf Aktien, Dusseldorf-Holthausen, Fed. Rep. of Germany

[21] Appl. No.: 309,379

[22] Filed: Oct. 7, 1981

[30] Foreign Application Priority Data

Oct. 8, 1980 [DE] Fed. Rep. of Germany ....... 3038001

[51] Int. Cl.³ .......................... B02C 7/00; B02C 19/06
[52] U.S. Cl. ....................................... 241/28; 106/93; 536/77; 536/86
[58] Field of Search ..................... 241/28; 536/77, 86; 106/93

[56] References Cited

U.S. PATENT DOCUMENTS 4,076,935  2/1978  Eichenseer et al. ............... 241/28

FOREIGN PATENT DOCUMENTS

| 1454824 | 7/1969 | Fed. Rep. of Germany | 241/28 |
| 2458998 | 5/1976 | Fed. Rep. of Germany | 241/28 |
| 2556821 | 6/1977 | Fed. Rep. of Germany | 241/28 |
| 1581954 | 9/1969 | France | 536/77 |

*Primary Examiner*—James Poer
*Attorney, Agent, or Firm*—Hammond & Littell, Weissenberger and Muserlian

[57] ABSTRACT

A method for the production of micropowders from cellulose ethers or cellulose comprising (a) subjecting a cellulose ether or a cellulose having a fine-fiber, cottony or woolly structure to a consolidation or embrittlement sufficient whereby in one mill pass through a jet mill under standard conditions 98% by weight of the consolidated or embrittled material charged is recovered as a powder of less than 100μ, and (b) subjecting the consolidated or embrittled material to a grinding step producing a size reduction sufficient that a grain size distribution with at least 90% by weight of less than 125μ is attained.

13 Claims, No Drawings

METHOD FOR THE PRODUCTION OF MICROPOWDERS FROM CELLULOSE ETHERS OR CELLULOSE

BACKGROUND OF THE INVENTION

The present invention relates to a method for the production of micropowders from cellulose ethers or cellulose, by which fine and extremely fine powders, not available by the methods known until now, can be obtained in a simple manner.

Numerous methods are known for comminuting and grinding the various grades of cellulose and cellulose ethers. Coarse shredding can be effected in a cutting mill. This yields normally a woolly, that is, long-fiber, product of low bulk weight. According to another method, a mat or fleece is produced from cellulose ethers by subjecting them to friction in rolls. There results a rolled mat or fleece which is broken and comminuted in impact cutters or pinned disk mills. The disadvantage of this method consists in that, on the one hand, a considerable proportion of long-fiber material always remains which must be screened and recirculated, and that on the other hand only relatively coarse products can be obtained.

Further, methods are known where the moist reaction products obtained in the production of cellulose ethers are kneaded while adding more water, coarsely shredded and then ground in hammer mills. Only thereafter is the moist product dried. By this method, however, practically only granulated materials can be obtained which after further grinding again show a more or less pronounced long-fiber structure.

A further known process is the grinding of cellulose ethers in ball or vibration grinding mills. For the production of fine powders of cellulose ethers of particle sizes of about 90% less than 100$\mu$, however, numerous passes are necessary in ball as well as in vibration grinding mills, with recirculation of the screen residue. Since with each mill pass a degradation of the macromolecules takes place, the products no longer fulfill the requirement of forming high-viscosity aqueous solutions. With the repeated mill passes necessary for fine powders, the loss of viscosity may be about 70% to 75% of the initial viscosity.

Lastly, these products are very inhomogeneous with respect to the chain length distribution of the macromolecules because of the different number of mill passes.

OBJECTS OF THE INVENTION

An object of the present invention is to develop a method for the production of micropowders from cellulose ethers or cellulose which does not have the disadvantages inherent in the known methods.

Another object of the present invention is to develop a comminution method which, with only minimal degradation of the cellulose macromolecules, leads to extremely fine powders, which also show good pourability. A further object connected with the above was the task to produce, in the case of water-soluble cellulose ethers, such micropowders as furnish high-viscosity solutions.

A further object of the present invention is the development of a method for the production of micropowders from cellulose ethers or cellulose comprising (a) subjecting a cellulose ether or a cellulose having a fine-fiber, cottony or woolly structure to a consolidation or embrittlement sufficient whereby in one mill pass through a jet mill under standard conditions 98% by weight of the consolidated or embrittled material charged is recovered as a powder of less than 100$\mu$, and (b) subjecting the consolidated or embrittled material to a grinding step producing a size reduction sufficient that a grain size distribution with at least 90% by weight of less than 125$\mu$ is attained.

These and other objects of the invention will become more apparent as the description thereof proceeds.

DESCRIPTION OF THE INVENTION

According to the invention, the problems and drawbacks of the prior art have been overcome in the development of a process for the production of micropowders from cellulose ethers or cellulose comprising (a) cellulose ether or cellulose, having a fine-fiber or cottony or woolly structure, is brought into a consolidated or embrittled form and thereafter (b) the consolidated or embrittled material is subjected to grinding, whereby it attains a grain size distribution of at least 90% under 125$\mu$.

More particularly, the present invention relates to a method for the production of micropowders from cellulose ethers or cellulose comprising (a) subjecting a cellulose ether or a cellulose having a fine-fiber, cottony or woolly structure to a consolidation or embrittlement sufficient whereby in one mill pass through a jet mill under standard conditions 98% by weight of the consolidated or embrittled material charged is recovered as a powder of less than 100$\mu$, and (b) subjecting the consolidated or embrittled material to a grinding step producing a size reduction sufficient that a grain size distribution with at least 90% by weight of less than 125$\mu$ is attained.

The consolidation or compaction occurs expediently in a vibration grinding or ball mill or else in a pellet press. The resulting destructurization in the consolidation stage is to be so extensive that a woolly or cottony fiber structure is eliminated and further, also, compaction to a tough, partially plastic material occurs. The degree of consolidation can usually be observed by the increase of the bulk weight.

According to the invention, a compaction and consolidation can be carried out with simultaneous destructurization in a pellet press or possibly in a briquetting device. For economic reasons one should here start with uncompacted material, although compacted material can also be used.

The pellets can be coarsely broken and then dried or sent to pulverizing directly. According to the invention, the advantage of this consolidation process resides in the extremely little degradation of the macromolecules. Including the subsequent grinding stage, the normal degradation of the macromolecules amounts to from 2% to 25%.

The destructurization can be carried out especially well in a vibration mill. Also a ball mill is similarly suitable. In these mills a consolidation of the cellulose or of the cellulose ethers takes place. The operating conditions of the mills are selected so that a particularly intensive consolidation occurs. With this mode of operation, only compaction with very little grinding takes place. However, a slight reduction in size during this compaction cannot be ruled out. The consolidation of the material is connected with a clearly recognizable alteration in form. Thus, when consolidated in a vibration mill, for example, the material is obtained in the form of scales.

The amount of consolidation or embrittlement of the cellulose ether or cellulose having a fine-fiber, cottony or woolly structure should be sufficient whereby in one mill pass through a jet mill under standard conditions, 98% by weight of the consolidated or embrittled material charged is recovered as a powder of less than 100μ. For this purpose a "Jet-o-mizer" laboratory jet mill of the firm Fluid-Energy was used. Its characteristics were an air throughput of 150 Nm$^3$/h, a solids throughput of 5 kg/h, and a size of 1 foot. It was established that under these standard conditions in a single mill pass 98 wt.% of the charged material is to be smaller than 100μ. If this condition is reached, sufficient consolidation or embrittlement per condition (a) of the invention exists. The grain size distribution was determined in a standardized air jet screen during 3 minutes.

The following table lists the results of the comparative study. In the first column the starting material is characterized, the percentages in parentheses signifying the fractions over 100μ. In the processing of the cellulose ethers listed in the first part of the table, ordinary compaction occurs. The reaction products, still moist, were put through an extruder, the resulting extrusions being cut up fine and dried. In one case with methyl-hydroxypropyl cellulose, roll compaction was effected additionally. However, the product obtained was so coarse that it was not drawn into the jet mill. Therefore, additional grinding in a baffle mill was effected. The fraction over 100μ was then 31%.

In the second part of the table, there is given as characteristic quantity the pretreatment in a vibration mill according to the invention. The fraction of over 100μ for spruce cellulose increased from the original 46% to 84%. This means that enlargement of the grain had occurred during the compaction or embrittlement. In the case of the pellet press it was necessary because of problems about the grain size to do an intermediate grinding in a baffle mill. Especially characteristic is the last example: Hydroxyethyl cellulose with 88% grain fraction over 100μ. By the treatment in the vibration mill this fraction does not change at all.

TABLE

| Starting material<br>Viscosity<br>(Brookfield) 2%<br>H$_2$O at 20° C. | Embrittlement | Grain size<br>after grinding<br>in a jet mill<br>under standard<br>conditions |
|---|---|---|
| (% > 100μ) | (% > 100μ) | (% > 100μ) |
| Methyl cellulose<br>4000 mPas (96%) | none | 89.4% |
| Methyl cellulose<br>8000 mPas (38%) | none | 28.1% |
| Methylhydroxyethyl cellulose<br>30,000 mPas (93%) | none | 88.7% |
| Methylhydroxypropyl cellulose<br>20,000 mPas (98%) | slight by roll compaction (31%)* | 22.0% |
| Invention | | |
| Spruce cellulose<br>DP approx 1050 (46%) | yes, vibration mill (84%) | 0.7% |
| Methylhydroxyethyl cellulose<br>23000 mPas - | yes, pellet press (40%)* | 0.2% |
| Carboxymethyl cellulose<br>4000 mPas (88%) | yes, vibration mill (11%) | 0.8% |
| Hydroxyethyl cellulose | yes, vibration mill (88%) | 1.8% |

TABLE-continued

| Starting material<br>Viscosity<br>(Brookfield) 2%<br>H$_2$O at 20° C. | Embrittlement | Grain size<br>after grinding<br>in a jet mill<br>under standard<br>conditions |
|---|---|---|
| 22500 mPas (88%) | | |

*Intermediate grinding in baffle mill necessary because of draw-in size of the jet mill.

The cellulose or cellulose ethers are supplied to the consolidation stage in uncompacted or compacted form. The bulk weights of the uncompacted, usually long-fiber charge materials are between 30 and 280 gm/l, preferably 75 and 160 gm/l. The compacted cellulose ethers, instead, have bulk weights between 280 and 480 gm/l, preferably 320 and 370 gm/l, and are obtained in granulated or pellet form before the consolidation or embrittlement stage. The compaction stage may alternatively be integrated into the consolidation stage, but then lower bulk weights will result.

The bulk weights in the inlet to the first process stage correspond to those stated before, while the water content differs. According to the invention, two operating ranges with respect to the water content are possible. In one instance, one starts with the moist reaction product with residual moisture contents of from 20% to 80% of water, preferably 40% to 60% of water, and in the other, a dried product with residual moisture contents of from 5% to 25%, preferably 12% to 20% of water, is used. While these ranges overlap, it depends on the specific properties of the various starting materials and on the machine type used for the consolidation. For vibration and ball mills, materials having from 12% to 20% of water are preferred, both ranges of water content are possible when consolidating using a pellet press.

The viscosity reduction is comparatively low because of the single mill pass and as a result of the low grinding effect. In addition, a coolable mill should be used according to the invention, to reduce the degradation. The cooling should be such that a product temperature of 85° C., preferably 55° C., is not exceeded at the outlet. In this way the viscosity reduction in high-viscosity cellulose ethers (n>30,000 mPa.s) is from 20% to 40%, depending on mode of operation and bulk weight.

The embrittled or consolidated products are subsequently transformed according to the invention into micropowders with the aid, preferably, of a jet mill. Due to the sifting effect of these mills, screening is unnecessary, as the oversize fraction is usually less than 1%. For the production of fine powders also, mechanical mills, such as baffle plate or pinned disk mills, can be used, the oversize fraction being less than 10% for many products, so that here, too, screening is unnecessary or is limited to some product types.

It has been found, surprisingly, that in the jet mill, the consolidated products can easily be transformed into micropowders. On the other hand, jet mills are not suitable for unconsolidated or uncompacted products, as these materials remain woolly and the degree of milling is low. Also, jet mills are well suitable for the production of such fine dusts which have a special explosion hazard, as the jet mills contain no moving parts and, therefore, there is no source of ignition in the system.

The grain size distribution of the products ground in a jet mill is narrower than that of mechanical mills. Because of the greater homogeneity, products result with considerably better application technological properties. The mean grain size can be set by way of the solids throughput at given mill size. Thus, at high cellulose or cellulose ether throughputs, fine dusts having a grain size distribution of 90% <100μ can be produced without problem, while at correspondingly reduced throughput, micropowders with fractions of 98% <80μ and also 98% <63μ can be obtained. With this mill even still finer micropowders can be produced at appropriate solids throughput. Of special advantage is the fact that in jet mills the degradation of the macromolecules is negligibly low, that is, usually it cannot be picked up by measuring instruments and is in nearly all cases under 10%.

The drying during grinding must be taken into consideration by appropriate water contents before the grinding. By addition of preheated air or gases, mill-drying is possible, so that a separate drying stage is unnecessary. Under the stated conditions, celluloses or cellulose ethers are obtained with final water contents of about 0.5% to 12%, preferably 3% to 6%.

The bulk weights of the products depend largely on the grain size distribution, product type and viscosity of the cellulose ethers or on the average degree of polymerization of the celluloses. Generally, uncompacted and highly viscous products with a high proportion of fine grain have lower bulk weights than compacted, low-viscosity and coarser cellulose ethers. Between these two extreme cases, where on the one hand values of from 200 to 300 gm/l and on the other, values of from 420 to 480 gm/l are typical, lies the entire spectrum of the combinations.

Use of a jet mill becomes profitable only below a certain grain size distribution. This limit is product-dependent and cannot be defined sharply. Profitability may exist already for the production of fine dust (90% <100μ).

For the production of less fine dusts the use of mechanical mills, such as pinned disk or baffle plate mills, is to be preferred for economic reasons. For these powders, also, the danger of explosion is clearly less and should be excluded by the use of inert gases. The consolidated celluloses or cellulose ethers can be transformed in simple manner into powders (90% <200μ) and fine powders (90% <100μ) in mechanical mills, often a single mill pass being sufficient.

According to the invention, micropowders can be produced from celluloses or cellulose ethers which have only low degradation rates or viscosity losses. Therefore, fine powders and micropowders in the viscosity range of about 10,000 to 50,000 mPa.s can be produced by this method.

According to experience up to now, the production of micropowders according to the invention is successful with the use of the various types of cellulose, such as linters, spruce and beech cellulose as well as the use of all known cellulose ethers, such as various alkyl and alkylhydroxy-alkyl as well as carboxy-alkyl celluloses.

The powders produced according to the invention find diversified application, for example, in the construction industry and in the home craftsman sector, as additives to plaster compositions, mortar, gravel, cement and plaster of Paris. Fine cellulose powders are used as fillers for molding compounds and plastics as well as vehicles for drugs in pharmacy.

Preferably, the ground cellulose ethers are added to the plaster compositions used in the construction industry to bind water. Because of the modern production of plaster compositions in machines, high-efficiency products must dissolve extremely fast. The rate of dissolution increases as the grain size distribution is shifted toward finer powders. For this application, therefore, fine powders and micropowders with a narrow grain distribution spectrum are increasingly in demand. For the addition of micropowders to machine-made plaster compositions, the instantaneous water retention capacity is improved to such an extent that, compared with current commercial products, the quantities of additives can be reduced by 20% to 50% without loss of quality.

The following examples are illustrative of the invention without being limitative.

EXAMPLES

The viscosity indicated in the following examples was determined in a 2% aqueous solution, assuming 5% moisture of the cellulose ether at 20° C. according to Brookfield.

EXAMPLE 1

12.6 kg of woolly methylhydroxypropyl cellulose with a bulk density of 160 gm/l were consolidated per hour in a cooled ball mill. The product was obtained in scale form with a bulk density of 350 gm/l and a temperature of 45° C. The viscosity of the cellulose ether dropped by the solidification from 48,000 to 34,000 mPa's. A marked reduction in size of the material could not be observed. The fine grinding of the consolidated methylhydroxypropyl cellulose was effected in a jet mill with a solid throughput of 5 kg/h and an amount of air of about 150 Nm³/h. The following particle size distribution of the trickleable product was measured:

43% >32μ; 6% >50μ; 1.5% >63μ.

| End viscosity | 33,300 mPa's |
|---|---|
| Bulk density | 280 gm/l |

EXAMPLE 2

40 kg/h of a methylhydroxyethyl cellulose with a bulk density of about 200 gm/l and a moisture content of 9% were pelletized in a press. The slight coloration of the product disappears, however, completely during grinding.

The compacted pellets were ground, on the one hand, in a jet mill, and on the other hand, in an impact disk mill.

The test results (initial viscosity 23,000 mPa's) result from the following table, where the results from the impact disk mill are bracketed.

| | Jet mill | Impact mill |
|---|---|---|
| Particle size distribution: | | |
| >32μ | 66% | (52%) |
| >50μ | 12% | |
| >63μ | 1.3% | |
| >125μ | — | (8%) |
| >200μ | — | (2.5%) |
| End viscosity: | 19000 mPa's | (21000) mPa's |
| Bulk density | 250 gm/l | (330) gm/l |

Similar results are obtained if a product with 48% moisture is pelletized, subsequently dried to 8%, and then ground in an impact disk mill. But the bulk density of the fine powder increased to 370 gm/l.

EXAMPLE 3

16 kg/h of a methylhydroxypropyl cellulose with a bulk density of 150 gm/l were embrittled in the cooled ball mill. After this solidification, the bulk density was 430 gm/l. The product with an initial viscosity of 42 mPa's was ground both in the jet mill and in the pinned disk mill (values in brackets).

|  | Jet mill | Impact mill |
|---|---|---|
| Particle size distribution: | | |
| >32μ | 61% | (82%) |
| >50μ | 17% | (66%) |
| >63μ | 4.5% | (52%) |
| >100μ | 1.1% | |
| >125μ | | (9%) |
| End viscosity: | 39 mPa's | (40) mPa's |
| Bulk density | 380 gm/l | (420) gm/l |

EXAMPLE 4

10 kg of woolly linters (cotton cellulose) with a moisture content of 4% and a bulk density of 108 gm/l were solidified per hour in a cooled ball mill. The bulk density rose to 320 gm/l. The particle size distribution remained with 83%>125μ practically constant. After grinding in the jet mill with a throughput of about 7 kg/h, the following particle size distribution was measured:

79%>32μ; 37%>50μ; 12%>80μ; 6%>100μ.

The average degree of polymerization (DP) of the cellulose decreased in this operation by 26%.

EXAMPLE 5

40 kg/h of long-fibered pine cellulose (DP-value about 1050) with a bulk density of 80 gm/l were pelletized in a press. After grinding in an impact disk mill, the following particle size distribution was measured after a single passage:

48%>63μ; 16%>125μ; 4%>200μ.

The results according to the foregoing examples regarding the degree of grinding are compiled in the following table with only one passage in each stage.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A method for the production of micropowders from cellulose ethers or cellulose comprising:
   (a) subjecting a cellulose ether or a cellulose having a fine-fiber, cottony or woolly structure to a consolidation or embrittlement sufficient whereby in one mill pass through a jet mill under standard conditions 98% by weight of the consolidated or embrittled material charged is recovered as a powder of less than 100μ, and
   (b) subjecting the consolidated or embrittled material in the form of scales to a grinding step of one mill pass through a jet mill or a pinned disk mill or a baffle plate mill, producing a size reduction sufficient that a grain size distribution with at least 90% by weight of less than 125μ is attained, with a macromolecular degradation of from 2% to 26%.

2. The method of claim 1 wherein said consolidated or embrittled material is ground in a jet mill in step (b) and a grain size distribution with at least 98% of less than 100μ is attained.

3. The method of claim 1, step (a), wherein said consolidation or embrittlement is effected in a vibration or ball mill, optionally with a cooling system, or a pellet press.

4. The method of claim 1 or 2 or 3 wherein simultaneously with said grinding step (b) a drying of said cellulose ether or cellulose to a water content of from 0.5% to 12% by weight is effected.

5. The method of claim 4 wherein said water content after said drying is from 3% to 6% by weight.

6. The method of claim 1 or 2 or 3 wherein a cellulose ether is employed that has been consolidated or embrittled in step (a) to have a bulk weight of between about 280 and about 480 gm/l.

7. The method of claim 6 wherein said bulk weight is between about 320 and about 370 gm/l.

8. The method of claim 1 or 2 or 3 wherein said cellulose ether or cellulose having a fine-fiber, cottony or woolly structure has a bulk weight of between about 30 and about 280 gm/l.

9. The method of claim 8 wherein said bulk weight is between 75 and about 160 gm/l.

TABLE

| 1. Solidification stage | 2. Grinding stage | Degree of grinding | | | |
|---|---|---|---|---|---|
| | | 90% > 200μ | 90% > 100μ | 98% > 80μ | 98% > 63μ |
| Swing or Ball mill | Jet mill | + | + | + | + |
| Swing or Ball mill | Pinned or impact disk mill | + | + | − | − |
| Pellet press or other briquetting device | Jet mill | + | + | + | + |
| Pellet press or other briquetting device | Pinned or impact disk mill | + | (+) | − | − |

+ achieved
− not achieved
(+) almost achieved

10. The method of claim 1 or 2 or 3 wherein said cellulose ether or cellulose having a fine-fiber, cottony or woolly structure has a moisture content of from about 0.5% to about 20% by weight and is selected from the group consisting of cellulose linters, spruce cellulose, beech cellulose, lower alkyl cellulose ether, lower alkyl-hydroxy lower alkyl cellulose ether and carboxy-lower alkyl cellulose ether.

11. The method of claim 10 wherein said moisture content is from about 8% to about 15% by weight.

12. The method of claim 1 or 2 or 3 wherein said consolidation or embrittlement in step (a) is conducted with a pellet press and said cellulose ether or cellulose having a fine-fiber, cottony or woolly structure has a moisture content of from about 20% to about 80% by weight.

13. The method of claim 12 wherein said moisture content is from about 40% to about 60% by weight.

* * * * *